United States Patent [19]

Haupt

[11] 3,963,192

[45] June 15, 1976

[54] TETHERING DEVICE KIT

[76] Inventor: Walter H. Haupt, 604 Wayne Road, Kenton Hills, Covington, Ky. 41011

[22] Filed: Apr. 10, 1975

[21] Appl. No.: 566,807

[52] U.S. Cl. ............................ 242/86.5 R; 56/10.2; 242/94
[51] Int. Cl.² ........................................ B65H 75/40
[58] Field of Search ........ 180/79; 56/10.2, DIG. 15; 242/85, 86.4, 94, 86.5 R

[56] References Cited
UNITED STATES PATENTS

| | | | |
|---|---|---|---|
| 2,540,434 | 2/1951 | Fengler | 242/86.4 |
| 3,414,211 | 12/1968 | Roberts | 180/79 X |
| 3,625,449 | 12/1971 | Landsem | 242/85 |
| 3,627,071 | 12/1971 | Haupt | 180/79 |

FOREIGN PATENTS OR APPLICATIONS 953,075  3/1964  United Kingdom.................. 180/79

Primary Examiner—M. H. Wood, Jr.
Assistant Examiner—John A. Pekar
Attorney, Agent, or Firm—Wood, Herron & Evans

[57] ABSTRACT

A tethering device kit particularly adapted for use with a self-propelled lawnmower. The kit includes a turret head having a pair of upstanding winding stakes, a tether cord being wound in loop formation about those stakes. The turret head is provided with a base mount that permits it to be fixed onto the rim of an automobile wheel. The base mount is fabricated such that the central axis of the turret head is coaxially disposed with the rotational axis of the wheel when connected thereto. At least one ground stake extends from the underside of the turret head in a direction opposite to that which the winding stakes extend. The ground stake or stakes are positioned so that same penetrate the ground when the wheel, with the turret mounted unit, is laid flat on the ground so that the winding stakes extend upward. A center sleeve in the turret head provides the bearing which permits the wheel to be raised on edge by a special removable handle, and then rolled to a new position. The handle is included in the kit.

5 Claims, 7 Drawing Figures

TETHERING DEVICE KIT

This invention relates to readily relocated tethering devices for self-propelled machines. More particularly, this invention relates to improvement of the particular tethering device disclosed in U.S. Pat. No. 3,627,071, issued Dec. 14, 1971 to Walter H. Haupt.

The earlier mentioned Haupt patent discloses winding stakes with a rope thereon mounted on a base, the base, by its weight alone, having sufficient immobility to resist dislodging forces transmitted to it through the tether rope while the lawnmower is circling about it. To achieve this stability the base must be made of heavy material, e.g., concrete, or consist of a shell made heavy by filling it, e.g., with water, so that the base may properly function as a tethering center. It is evident that this base is the most expensive part of such a tethering device unit. Further, it is evident that this base is also, necessarily, the most bulky part to handle in marketing and shipping.

The novel features of the tethering device shown in the earlier mentioned Haupt patent have been retained, but basic improvements have been achieved by providing kit structure by which the same desirable ends can be more conveniently achieved. One primary object of the present invention is to make it possible to achieve the results obtained in the Haupt U.S. Pat. No. 3,627,071 by converting an object already in the hands of the potential user, or readily available to him, as the base of such a tethering device. The object to be converted is an idle snow tire or spare tire on its mounting rim. A tire, by its very nature, would provide desirable rolling action when the unit is to be relocated.

For this conversion a kit of parts would be supplied. This kit basically contains a turret which can be centrally bolted to the wheel utilizing the existing lug holes in the rim. The turret would include the winding stakes for the tether rope, and the central bearing sleeve by which a special handle included in the kit can be used to raise, roll, and reposition the base. To compensate for the lesser weight of this novel assembled base (consisting of the turret head and wheel), compared with the weighted base of the previous Haupt concept, one or more ground penetrating stakes are provided. These stakes are mounted on the wheel opposite to the upward projecting winding stakes. The winding stakes, in their working position, penetrate the ground enough to add the necessary lateral or rotational stability required for proper tethering when the wheel is laid flat on the ground.

Other objectives and advantages of this invention will be more readily apparent from the following detailed description taken in conjunction with the drawings in which.

Figure 2:
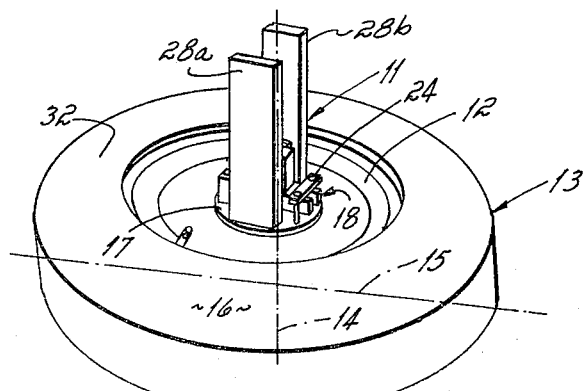
FIG. 2 is a diagrammatic perspective view illustrating a turret head mounted to a wheel.
Figure 5:
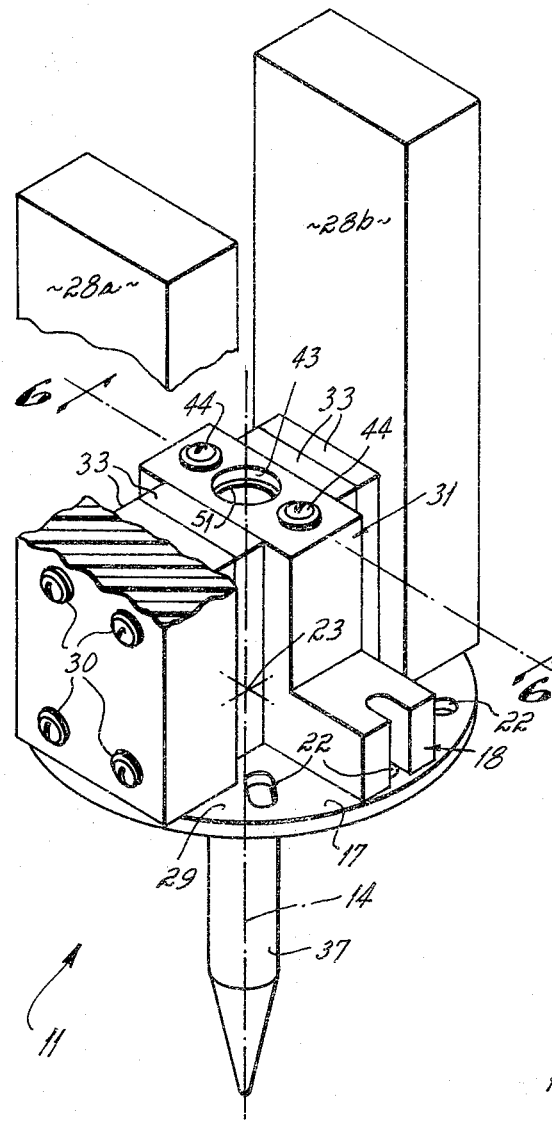
FIG. 5 is a broken away perspective view illustrating the preferred structure of the turret head.

As particularly illustrated in FIGS. 2 and 5, the tethering device kit 10 of this invention includes a turret head 11 adapted to be mounted onto the rim 12 of an automobile wheel 13, the turret head having a vertical center axis 14 that is perpendicular relative to the plane 15 of the wheel. An automobile wheel 13, of course, comprises both the rim 12 and the tire 16 mounted thereon. The turret head 11 includes a base plate 17 provided with mounting means 18 for attaching that base plate onto the wheel's rim 12 through the bolt holes 21 in that rim. The base plate 17 includes a series of slots 22 disposed about the plate's periphery, the slots being elongated in length radially of the base plate's centerpoint 23 (which is coincident with the center axis 14) so as to accommodate various diameter rims, see FIG. 5. The turret's base plate 17 is bolted onto the rim 12 through the rim's bolt holes 21 by means of bolts 24 and nuts 25.

A pair of winding stakes 28a, 28b are positioned on opposite sides of the turret's center axis 14. The upstanding winding stakes 28a, 28b, which extend from the top face 29 of the base plate 17, are held in fixed engagement on the base plate by four bolts 30 that pass through the turret's head block 31. When the base plate 17 is fixed to the wheel's rim 12, the winding stakes extend outwardly beyond the plane defined by the topside 32 of the wheel 13. Shims or spacer blocks 33 are interposed between the turret's head block 31 and the upwardly extending winding stakes. Additional shims (not shown) may be included as desired so as to vary the winding circumference for the tether cord 26 wound onto those stakes. The farther apart the winding stakes 28a, 28b are located on the turret's base plate 17, the less the number of revolutions the lawnmower makes as it proceeds from the innermost tether cord or fully wound position to the outermost tether cord position, see FIG. 1, thus adapting to mowers of wide cutting swaths.

The turret head 11 also includes a center ground stake 37 which extends from the turret head's base plate 17 such a distance that, when the base plate is mounted in operating position on the wheel's rim 12, the ground stake will extend beyond the plane defined by the underside 38 of the wheel 13, i.e., down beneath the bottom plane of the wheel when the wheel is resting flat on ground level. In this manner, the first ground stake 37 will be received into the ground on which the wheel 13 lies, thereby aiding in preventing horizontal displacement of the wheel 13 (and, hence, of the center axis 14) as the lawnmower 39 rotates therearound in spiral path 40 fashion. Horizontal displacement of the center axis 14 is undesirable because such would foul up the symmetry of the lawnmower's spiral path, thereby perhaps removing the overlap needed between concentric spiral cuts. In other words, and because the wheel 13 is not of a heavy enough weight by itself to prevent the center axis 14 from sliding across the ground when the lawnmower is following its spiral path therearound, the first ground stake 37 is forced into the ground to aid in holding the wheel 13 in the desired operational position on the lawn. The presence of the wheel 13 in combination with the turret head 11 does, however, provide a base of some breadth and weight for the winding stakes 28a, 28b, thereby providing the necessary vertical stability for the central axis 14 vis-a-vis tipping of the axis (as opposed to total horizontal displacement from one location to another, of the entire turret head/wheel assembly).

The ground stake 37 is received through the base plate 17 into bore 43 within the head block 31, the head block fixed to the base plate 17 by bolts 44. An adjustable collar or clamp 45 is disposed on the ground stake immediately beneath the base plate, and held there in sandwich fashion by a washer 46. The washer 46 is held in place by the bolts 44, which protrude from the underside of the plate 17, and nuts 47. The adjustable clamp is provided with a screw 48 to permit tightening and loosening of that clamp around the stake so as to locate the ground stake in telescoping fashion within head block 31 where desired. Thus, the ground stake 37 is adjustable axially of the base plate 17 so as to extend same as required depending on the axial location of the flange of the wheel 13 to which the turret head 11 is attached, thereby insuring that the ground stake will be forced into the ground when the wheel 13 is laid upon the ground preparatory to use of the lawnmower.

Figure 3:
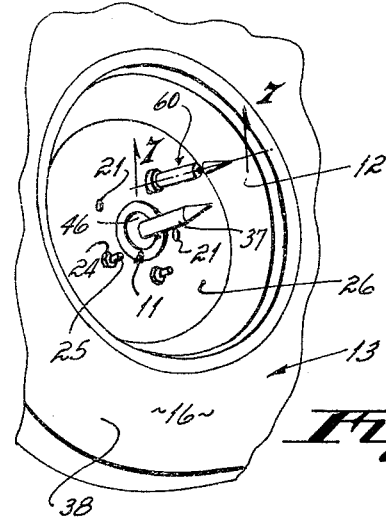
FIG. 3 is a view similar to FIG. 2 except viewed from the bottom side of the wheel.
Figure 7:
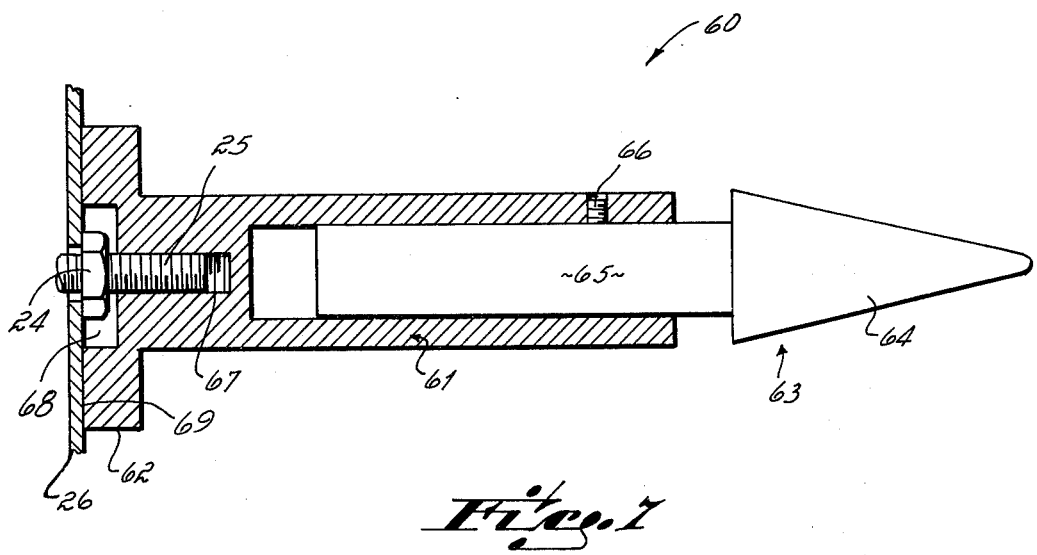

A second ground stake 60 is also provided in the kit. This second ground stake 60 is separate from the turret head 11 and, therefore, separate from that ground stake 37 fixed to the base plate 17. The separate or second ground stake 60, which is illustrated in FIGS. 3 and 7, is a two-part stake comprised of an upper tubular member 61 having a T-shaped head 62 at one end thereof. A bottom member 63, comprised of an integral pointed tip 64 and shaft 65, is telescopingly received within the upper member 61. The position of the bottom member 63 vis-a-vis the upper member 61 may be fixed at the desired extension length by set screw 66. The T-shaped head 62 of the upper member 61 is provided with a tapped bore 67 therein, this bore being sized to one screw 25 that holds the turret head 11 in fixed combination with the rim's flange 26, see FIG. 3. A recess or seat 68 is provided on the top of the T-shaped head 62, same being positioned coaxially with the threaded bore 67 so as to permit rotation of the second ground stake as same is threaded onto the bolt 24 that extends through the rim's flange 26 until top surface 69 of that head 62 abuts the rim's flange. This second ground stake 60 is, of course, adjustable so that it penetrates the ground when the wheel is laid flat, too. The second ground stake 60 thereby cooperates with the first ground stake 37 to resist rotational slippage of the wheel due to torsional pull of the tether rope while the mower 39 circles.

Figure 4:
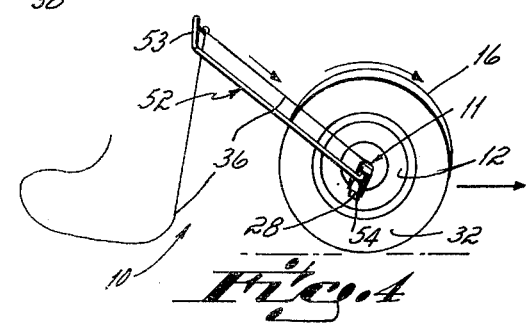
FIG. 4 is a diagrammatic perspective view illustrating the manner in which the cord of the tethering device is rewound.
Figure 6:
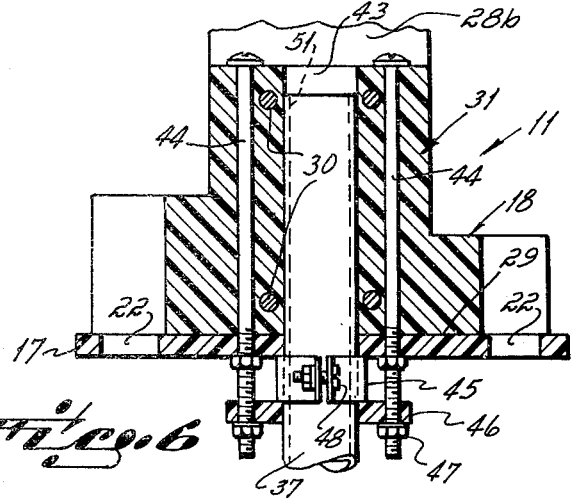
FIG. 6 is a cross-sectional view taken along line 6—6 of FIG. 5.

The upper end of the ground stake 37 (which is received in the head block 31 fixed to the turret's base plate 17) is hollow and defines a bearing sleeve 51, see FIGS. 4 and 5. A detachable handle 52 is provided to cooperate with that bearing sleeve 51, and hence with the turret head 11, when that turret head is fixed to the wheel 13. The detachable handle 52 includes a hand grip section 53 at one end, and a bearing section 54 at the opposite end, of the handle shank portion 53. When assembled, the handle's bearing section 54 is inserted into the bearing sleeve portion 51 of the ground stake 37. A stop collar (not shown) secured to the handle's bearing section 54 abuts the outer end of the tubular sleeve, to limit the extent of insertion of the handle's bearing section thereinto. When the handle 52 and turret head 11 are assembled, the handle's hand grip section 53 is of a length that permits proper guiding while moving the fully erected tethering device from one location to another, see FIG. 4.

As mentioned, the inner end of the tethering cord 36 is fixed to the winding stakes 28a, 28b. The outer end of the tethering cord 36 is anchored to a snap catch which provides an easy snap on/off connection to the lawnmower. The snap catch which may be of any known type, interconnects with an eyelet attached to the forward end 58 of the mower 39 (FIG. 1).

In use, the turret head 11 is first fixed to the outside face of a wheel's rim 12 (bolts 24 and nuts 25 being provided to connect the turret's base plate 17 with the rim through the rim's lug holes, not shown). The second ground stake 60 is then threaded onto one of the bolts 24 that extend to the underside of the rim's flange 26. Thereafter, the wheel 13 is then laid horizontal onto ground in a desired central location with the winding stakes 28a, 28b extending upwardly, the ground stakes 37 and 60 piercing the ground so that the wheel's tire 16 lies flat on top the ground. The tether cord 36, which has been previously wound onto the winding stakes 28a, 28b, is then attached as at 58 to the mower 39.

Figure 1:
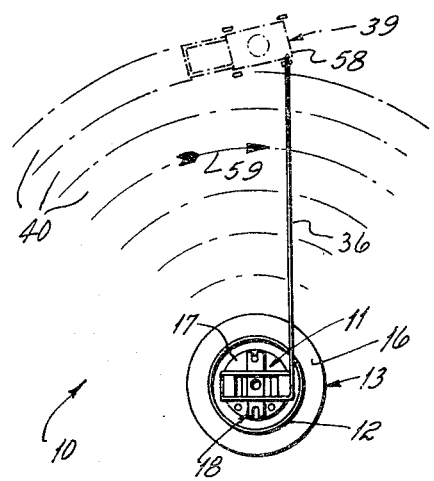
FIG. 1 is a diagrammatic top plan view of the tethering kit incorporating the principles of this invention.

As shown in FIG. 1, the self-propelled lawnmower is then permitted to circle about the turret head 11 (and, hence, the wheel 13) in a clockwise direction as indicated by the arrow 59. The lawnmower 39 describes a generally spiral path receding from the wheel 13, the spacing of the winding stakes 28a, 28b being such that the outer spiral swath overlaps by a few inches the previously cut swath as the tether cord 36 is paid out from the turret head 11. It will be understood that the width of swath or cutting path 40 will vary according to the size of the lawnmower. A mower of intermediate size will cut a narrower path 40 than a mower of larger size. Depending upon the size of the mower, shims 33 may be interposed between the turret's head block 31 and the winding stakes 28a, 28b so as to increase or decrease the length of the loop of the cord about the winding stakes as the cord is wound or unwound as required.

At completion of the mowing operation, the snap catch on the cord 36 is disengaged from the mower, and the handle's bearing section 54 inserted into the bearing sleeve 51 portion of the ground stake 37. The handle 52 may then be used as a lever to erect the wheel 13 from the flat anchored position (FIG. 2) to a vertical or rolling position (FIG. 4). After the wheel 13 has been erected into the substantially vertical transfer position, the handle 52 is used for pushing the wheel and for guiding it. During the rolling of the wheel 13 from one grass cutting position to another, the tether cord 36 is rewound onto the stakes. After the tether cord 36 has been rewound or reeled in onto the winding stakes 28a, 28b, and the wheel 13 has been pushed to a new location, the lawnmower is again anchored to the snap catch end of the tether cord 36 to repeat the mowing cycle.

Having described the preferred embodiment of my invention, what I desire to claim and protect by Letters Patent is:

1. A tethering kit for use with self-propelled machines, said kit being connectable with a tire rim having a center flange and lug holes, said kit comprising
    a turret head that includes
        at least one winding stake fixed in place on and extending upwardly from a base plate, said winding stake being of a length sufficient to extend outwardly beyond the plane of one side edge of said rim when said turret head and said rim are connected, mounting means adapted through said lug holes to connect said base plate and said rim in fixed relation, said mounting means including at least two slots formed in said base plate, said slots being disposed radially relative to the center axis of said turret head, and bolt means adapted to pass through said base plate's slots and said rim's lug holes, a first ground stake fixed to said base plate, said first ground stake being located at the center axis of said turret head and being coaxially oriented with said rim when said base plate and said rim are connected, and said first ground stake being of a length sufficient to extend beyond the plane of the other side edge of said rim when said base plate and said rim are connected, and a bearing element located at the center axis of said turret head, said first ground stake being hollow at the upper end thereof to form said turret head bearing element, a tether cord fixed at one end to said winding stake, said tether cord being adapted to connect with a self-propelled machine at the other end, and a detachable handle having an end portion in the form of a bearing element, said handle bearing element being rotatably interfitted with said turret head bearing element during transfer of said rim from one location to another, and said handle bearing element being removed from said turret head bearing element after transfer of said rim from one use location to another, said rim being lifted by said handle from a substantially horizontal use position to a substantially vertical transfer position after said handle bearing element is rotatably interfitted with said turret head bearing element, and said rim being thereafter rolled to a new use location, thereby converting the stationary base to a movable winding reel so as to rewind said tether cord upon said winding stake.

2. A tethering device kit as set forth in claim 1 including
at least two winding stakes, said winding stakes being spaced one from the other relative to the center axis of said turret head so that said tether cord forms loops approximately coaxial with said turret head when wound thereon, and
loop regulator means interconnectable with said turret head and operable as desired by the user, said loop regulator means permitting the distance between said stakes to be varied so as to accommodate said turret head to different size tether cord loops would thereon.

3. A tethering device kit as set forth in claim 1 including
adjustment means that permits said ground stakes to be extended from said base plate as desired.

4. A tethering device kit as set forth in claim 1 including
a second ground stake adapted to be fixed to said rim, said second ground stake also being of a length sufficient to extend beyond the plane of the other side edge of said rim when mounted to said rim.

5. A tethering device kit as set forth in claim 4 wherein said second ground stake is adapted to be threaded onto a bolt used to mount said base plate to said rim.

* * * * *